United States Patent [19]

Jones

[11] 4,138,158
[45] Feb. 6, 1979

[54] DUMP BODY BRACE

[76] Inventor: Eldon D. Jones, R.R. 2, Lake Crystal, Minn. 56055

[21] Appl. No.: 842,715

[22] Filed: Oct. 17, 1977

[51] Int. Cl.² ............................................. B60P 1/04
[52] U.S. Cl. ................................ 298/17 B; 217/60 B
[58] Field of Search ............. 298/17 B; 292/262, 338; 280/475; 217/60 R, 60 B

[56] References Cited

U.S. PATENT DOCUMENTS

| 1,694,550 | 12/1928 | Mellem | 292/338 |
| 3,348,861 | 10/1967 | Curtis et al. | 280/475 |
| 3,600,032 | 8/1971 | Gross | 292/262 X |
| 3,813,124 | 5/1974 | Roland | 298/17 B |

Primary Examiner—L. J. Paperner

Attorney, Agent, or Firm—Geoffrey R. Myers; William D. Hall

[57] ABSTRACT

A brace for supporting a dump body of a vehicle including means for attaching the brace to a long sill of the body, means for supporting the weight of the body on the vehicle chassis, shaft means rotatably attaching the support means to the attaching means, means for retaining the support means on the long sill of the body and means normally biasing said retaining means into engagement with the long sill of the body. The brace is lowered into position by pulling against the biasing means until the retaining means are disengaged from the body long sill and rotating the brace to its down position. The brace is raised by pulling against the bias, rotating the brace to its retained position and allowing the biasing means to lock the brace into position.

24 Claims, 3 Drawing Figures

DUMP BODY BRACE

This invention relates to truck safety apparatus and methods. More particularly, this invention relates to safety braces for dump trucks and methods using same.

Dump trucks are generally made by pivotally mounting a dump body on a chassis-cab. The chassis-cab employed is usually a conventional, mass-produced item available in a wide variety of models and sizes from "pick-ups" to large heavy-duty multiframed vehicles. It is formed of a cab, engine, axles and a chassis frame (usually comprised of two parallel, longitudinal frame members and one or more cross members) extending rearwardly from the cab.

The dump body is located on the chassis frame and is usually pivotally mounted at the rear of the frame so that its front end (the end nearest the cab) is raisable and lowerable with respect to the rearward pivot point. This enables a load carried in the body to be dumped from the rear end of the body upon raising of its front end. This, of course, is a typical configuration to which there are exceptions such as where the body may be pivoted on one side so as to unload sideways rather than rearwardly.

The dump bed or body is usually raised and lowered by a hoist assembly conventionally operated by a hydraulic fluid operated system comprised of a power take off, pump and directional valve manipulated from manual controls located in the cab. Such operating mechanisms often employ pull cables, pump leavers, remote mount shafts, limit cables and the like which result in a portion of the mechanism being located between the longitudinal frame members of the chassis frame rearward of the cab.

In addition to these mechanisms being located between the frame members of the chassis and rearward of the cab, numerous other truck parts are also found in this location, such as the drive shaft, various brake lines, the hoist and the like. When repairs must be made to these parts or other work done at this location, the body must be raised and the workmen must work thereunder. Often such work necessitates the workmen to lean over the chassis frame, thus placing some portion of his body in a pinch point between chassis frame and dump body should the body descend unexpectedly.

It is common knowledge among trained personnel in the industry that the body should be blocked or propped at any time a person is called upon to work under the body when raised or at any other time the body is raised and when the hoist is not being operated. In the past, most repairmen have depended upon the use of a large block (usually a large wood plank) located at the pivot point to prevent unexpected descent of the body. Others have used elongated shafts, such as wood planks or metal pipes to brace the body from its front end rather than at its pivot point. These shafts are retained in place solely by the weight of the body and the location of the shaft's ends (usually one end against a body cross-sill and the other on a chassis cross-member). They often are in the way of work that must be done, and can be dislodged inadvertently.

Rather sophisticated braces have been devised for more permanent and better support. Unfortunately these braces have often been relatively expensive, not easily operated or installed, contain safety defects in their design or the like, each or all of which has discouraged their use to the point where despite applicable governmental safety standards they are not being purchased by the consumer. Instead the consumer (or his repairman) continues to rely on the availability of non-permanently attached blocks or braces or, all too often, the consumer merely fails to use any blocking or bracing mechanism of any kind. This in turn has resulted in numerous accidents and deaths and has presented the industry with one of its most serious safety problems associated with the work-oriented operation of a truck.

It is apparent from the above that there exists a need for a simple, easily installed, strong, inexpensive and easily operable body brace which by its simplicity will encourage both purchase and use. It is a purpose of this invention to fulfill this and other needs apparent to the skilled artisan given the following description.

Generally speaking this invention fulfills the abovedescribed needs by providing a brace for a dump body pivotally mounted on a truck chassis frame, the brace including means for attaching the brace to the dump body, means for supporting the weight of the body on the chassis frame, shaft means rotatably attaching the support means to the attaching means, means for retaining the support means on the body, means normally biasing the retaining means into engagement with the body, and means for actuating the brace against its biasing means.

The method of operating the braces of this invention includes locating the brace in its normally retained position by actuating the biasing means to bring the retaining means into retaining engagement with the body; and thereafter actuating the brace against its biasing means until the retaining means are disengaged from the body, rotating the shaft means until the support means is in proximal supporting relationship to the chassis frame and lowering the body until the support means supports the weight of the body on the chassis frame.

In certain preferred embodiments of this invention the biasing means comprises a simple coil spring located about a portion of the rotatable shaft and the actuating means is a simple handle located on the outboard side of the support means which is an elongated column attached at one end to the rotatable shaft and at the other end to the retaining means.

The term "dump body" is used herein to mean a body which is pivoted on a chassis frame to dump a load which it is carrying. The term is used, in this sense, in accordance with its generic meaning in the art and thus refers to all dump bodies including those which carry loads other than earth, such as grain, farm produce and the like.

This invention will now be described with reference to certain embodiments thereof as found in the accompanying illustrations wherein:

IN THE DRAWINGS

Figure 1:
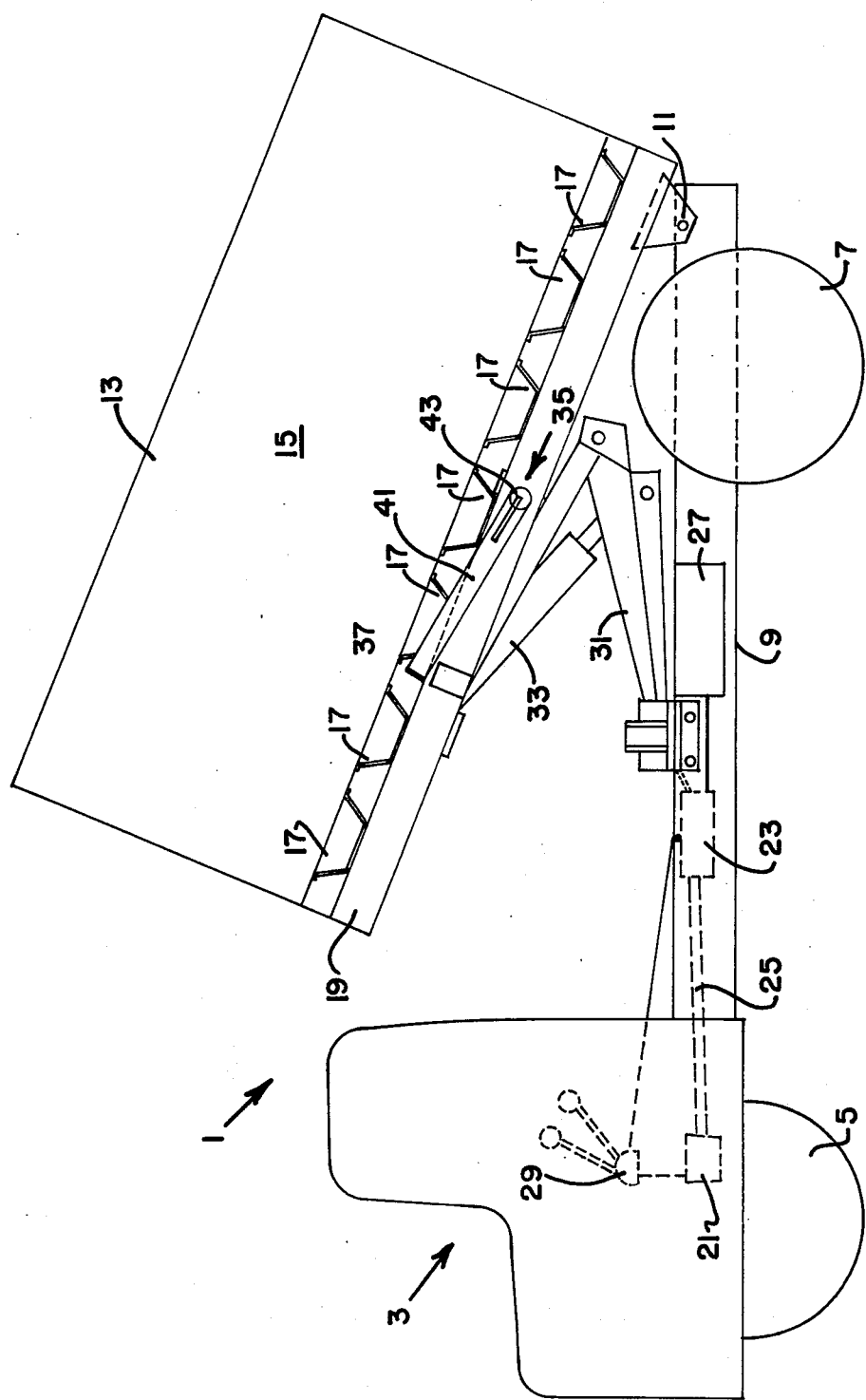
FIG. 1 is a side, partial plan view of an embodiment of this invention.

With reference to the drawings, FIG. 1 illustrates a typical dump truck 1 conventionally comprised of a cab and engine assembly 3, a front axle and wheel 5, a rear axle and wheel 7 and a longitudinally extending frame member 9. It is, of course, understood that truck 1 has two such frame members 9, one on either side of the vehicle. Mounted in conventional fashion by pivot means 11 on frame 9 is a dump body 13. Body 13 is shown in a partially raised position so as to illustrate other components as hereinafter described. Dump body 13 is formed of a load carrying box section 15, cross members 17 and a long beam 19 on each side of the body aligned with frame members 9 so that when body 13 is in its down position the lower surface of each long beam 19 rides on the upper surface of its proximal frame member 9.

The mechanism for pivoting (i.e., raising and lowering) body 13 may conventionally include a power take-off device 21, a hydraulic pump and valve 23, a remote mount shaft 25, a fluid reservoir 27, manual cable controls 29 and hydraulic hoist 31. The hoist is operated in conventional fashion by hydraulic fluid pumped via pump and directional valve 23, the mode of which is determined by the pump handle of controls 29. Pump 23 is powered from shaft 25 by power take-off device 21 which in turn is connected to the transmission (not shown) of the truck. Hoist 31 is operated via cylinder means 33, thus raising and lowering the body to or from its dump position about pivot 11.

Figure 3:
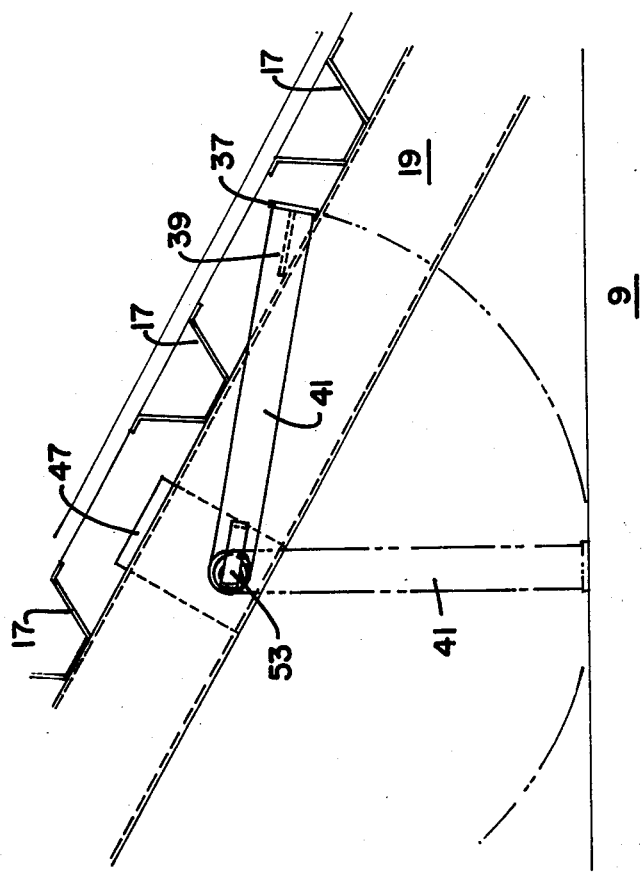
FIG. 3 is a partial side plan view of the embodiment of FIG. 1 showing the brace in its retained (full line) and body supporting (dotted line) mode.
Figure 2:
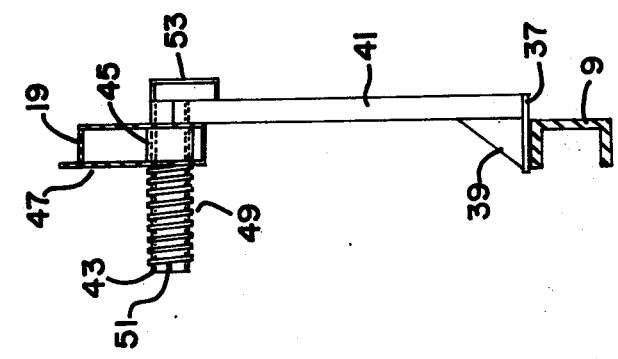
FIG. 2 is a front plan, partially sectionalized view of the brace illustrated in FIG. 1.

With particular reference to FIGS. 2-3, there is illustrated a brace 35 in accordance with this invention for retaining body 13 in its up position. Brace 35 is comprised of a lower plate 37 supported by gusset 39 and attached to column support means 41 at support means 41's lower end. The upper end of support 41 is saddle-shaped so as to be readily joined to shaft 43 as by welding. Shaft 43 is rotatably retained in long beam 19 by attaching tube 45 secured through a hole in long beam 19 and back-up plate 47 secured to the ends of the horizontal flanges of long beam 19. Shaft 43 is of slightly less diameter than tube 45 so as to be securely held but freely rotatable therewithin.

The ends of shaft 43 are exposed in that they extend outboard and inboard of beam 19 and beyond the ends of tube 45. On the inboard end of shaft 43 there is provided a biasing coil spring 49, preferably of the closed end type (i.e., closed coil) at each end and held in place at its inboard end by retaining pin 51. Retaining pin 51 may be of any desired type, but is preferably a roll pin for ease of installation. The outboard end of spring 49 abuts the inboard surface of back-up plate 47. In this way spring 49 continuously exerts a force to normally bias shaft 43 and thus column 41 in the inboard direction. Handle 53 located on the outboard side of shaft 43 and column 41 serves as a convenient means for actuating the brace against this bias of spring 49.

FIG. 3 illustrates the operation of brace 35. When not being used to support dump body 13, brace 35 is held securely in position by locating plate 37 and gusset 39 between two cross members 17 of body 13. Since spring 49 usually biases the brace inwardly, plate 37 serves as a convenient retaining member by residing on the upper horizontal flange of long beam 19. While not necessary, in certain embodiments when plate 37 and gusset 39 are so located, column 41 is pulled sufficiently far inwardly so as to reside against the outboard side of the vertical flange (web) of long beam 19, thereby even more firmly retaining brace 35 in its "up" or "riding" position. In this respect, column 41 may extend either rearward or forward of shaft 43 as convenience dictates. In FIG. 1 for example, shaft 43 is rotatably located within attaching tube 45 at a point somewhat forward of rear wheel 7 and column 41 extends forwardly. While any location may be used, this one in many truck configurations will be convenient for easy operation and thus encourage usage of brace 35.

To lower brace 35 into supporting engagement with chassis frame member 9 when body 13 is elevated, handle 53 is grasped and pulled outboard. This actuation against the bias of spring 49 frees plate 37 and gusset 39 from the confines of body 13, thus, allowing support column 41 to rotate freely downwardly until by gravity it seeks a vertical position. Releasing of handle 53 actuates the return to normal bias of spring 49 which draws column 41 inboard until plate 37 is drawn in and aligned above chassis frame member 9. In certain embodiments column 41 is drawn inwardly a sufficient distance to contact the vertical flange (web) of long beam 19. The body is then lowered until plate 37 contacts frame member 9, thus bearing the weight of body 13 and bracing it against inadvertent falling.

To return brace 35 to its "up" or retained position, handle 53 is again pulled outwardly after body 13 is raised to free brace 35 from the weight of body 13. Column 41 is then rotated upwardly until plate 37 and gusset 39 are adjacent a desired hole between cross members 17 of body 13. The outward force on handle 53 is then released, allowing the normal bias of spring 49 to pull plate 37 and gusset 39 into the hole. The handle 53 may still be held during this action, as can column 41 to help guide plate 37 and gusset 39 into the hole. Release of handle 53 allows plate 37 to securely rest on the upper horizontal flange of long beam 19.

It is to be noted that the operation of brace 35 may be accomplished by a single operator. This is a significant feature since in certain instances a lone repairman or truck driver must actuate the brace because no help is available.

Only one brace 35 may be used, or for large bodies one brace 35 on each long beam 19 may be employed. Brace 35 is easily installed merely by drilling or cutting the requisite hole in long beam 19 and locating the brace parts accordingly. In this way a strong, simple, inexpensive and easily operated safety brace is provided.

Once given the above description, many other features, modifications and improvements will become apparent to the skilled artisan. Such other features, modifications and improvements are considered a part of this invention, the scope of which is to be determined by the following claims.

I claim:

1. A safety brace mechanism for holding a dump body pivotally mounted on a truck chassis frame in an elevated position above said chassis frame, the safety brace mechanism including a hollow open ended cavity extending laterally in said body, a shaft extending through said cavity and being rotatable therewithin, an outboard end of said shaft extending beyond the open end of said cavity, said outboard end of said shaft being secured to an elongated support column radially extending therefrom and located outboard of said body, coil spring means located in connection with said shaft to normally bias the support column toward said body, retaining means extending laterally from the support column toward the body, means provided in the body for engaging the retaining means, said coil spring means normally biasing the retaining means into engagement with said engaging means, and manually operable handle means connected to the support column porximal its shaft connection and extending outboard of said column for pulling the shaft and column in an outboard direction against the bias of said coil spring from a location which does not require the operator to have any portion of his body in the pinch point between the chassis frame and body, said coil spring means being compressible by outboard movement of said handle to an extent sufficient to allow the engaging means to be disengaged from said retaining means.

2. The brace according to claim 1 wherein said column, shaft, engaging means and coil spring means are cooperatively connected to allow the column after outboard actuation of said handle and movement of said retaining means beyond engaging alignment with said engaging means, to freely rotate by gravity alone to a position of extension between said chassis and body and thereafter to be drawn into supporting position without manual force by said coil spring thereby to hold said body in an elevated position above said chassis.

3. A brace according to claim 1 wherein said hollow open ended cavity is in a long beam of said body and said cavity is provided with a hollow open ended tube through which said shaft extends and in which said shaft is rotatable.

4. A brace according to claim 3 wherein the shaft extends both inboard and outboard beyond the extremities of said tube and the inboard end of said shaft extends through said coil spring.

5. A brace according to claim 4 wherein said spring is retained about said shaft at one end by a pin extending from said shaft and at the other end by a first plate member through which said hollow tube and said shaft extend.

6. A brace according to claim 5 wherein said first plate member is attached to the inboard side of said body long beam and said coil spring terminates in a closed loop at both ends, the inboard end abutting said pin and the outboard end abutting said first plate member.

7. A brace according to claim 6 wherein said retaining means includes a second plate member attached to and extending beyond the peripheral confines of the end of the column to which it is attached.

8. A brace according to claim 7 which further includes a gusset member extending between said column and said second plate member.

9. A brace according to claim 7 wherein said second plate member is located at the bottom of the cavity and contacts the top of said chassis frame when said column is in supporting position.

10. A brace according to claim 1 wherein said brace is fully operable by a single individual.

11. A brace according to claim 1 which further includes a chassis frame member to which said dump body is pivotally mounted and means for pivoting said dump body with respect to said chassis frame member.

12. In the combination of a dump body pivotally connected to a truck chassis frame member and a safety brace mechanism for supporting said body in elevated position on said chassis frame member, the improvement comprising a safety brace mechanism which includes means for supporting the weight of the body on the chassis frame, shaft means rotatably attaching the support means to the attaching means, means for retaining the support means on the body, means normally biasing the retaining means into engagement with the body and means for actuating the brace against its biasing means, and wherein said dump body comprises a long beam whose lower surface is located proximate to the chassis frame member when the body is in its lower most position, and cross members extending laterally above said long beam thereby to define a cavity between said cross members, said retaining means residing in said cavity when said brace is not supporting said body.

13. The vehicle of claim 12 wherein said long beam includes a vertical web and an upper and lower horizontal flange, said attaching means comprises a hollow tube extending through the vertical web of said long beam and said shaft means extends through said tube, the ends of said shaft means extending both inboard and outboard a finite distance beyond the extremeties of said tube, the outboard end of said shaft means having attached thereto and extending radially therefrom said supporting means and the inboard end of said shaft means having associated therewith said biasing means.

14. The vehicle of claim 13 wherein said supporting means comprises a column member attached at one end to said outboard shaft end and at the other end to said retaining means.

15. The vehicle of claim 14 wherein said biasing means is a coil spring having extending therethrough the inboard end of said shaft, said coil spring being retained at one end by a pin extending from said shaft and at the other end by a first plate member through which said hollow tube and said shaft extend, said first plate member being attached to and extending between the upper and lower horizontal flange of said long beam.

16. The vehicle of claim 15 wherein said retaining means includes a second plate member attached to and extending beyond the peripheral confines of the end of the column to which it is attached, said second plate member contacting the upper horizontal flange of said long beam when said retaining means resides in said cavity.

17. The vehicle of claim 16 wherein said actuating means comprises a handle, said handle being attached to the outboard side of said column.

18. The method of operating a safety brace mechanism which is attached to a dump body pivotally mounted on a truck chassis frame, the brace mechanism including a hollow open ended cavity extending laterally in said body, a shaft extending through said cavity and being rotatable therewithin, an outboard end of said shaft extending beyond the open end of said cavity, said outboard end of said shaft being secured to an elongated support column radially extending therefrom and located outboard of said body, coil spring means located in connection with said shaft to normally bias the support column toward said body, retaining means extending laterally from the support column toward the body, means provided in the body for engaging the retaining means, said coil spring means normally biasing the retaining means into engagement with said engaging means, and manually operable handle means connected to the support column proximal its shaft connection and extending outboard of said column for pulling the shaft and column in an outboard direction against the bias of said coil spring from a location which does not require the operator to have any portion of his body in the pinch point between the chassis frame and body, said coil spring means being compressible by outboard movement of said handle to an extent sufficient to allow the engaging means to be disengaged from said retaining means, the steps of said method comprising, locating the brace in its normally retained position wherein the engaging means engage said retaining means, grasping the handle from a position wherein no portion of the operator's body is located within the pinch point between the chassis frame and body, pulling the handle outboard a sufficient distance to disengage said retaining means from said engaging means, rotating said colunn to a position substantially perpendicular with said chassis frame and thereafter allowing said coil spring means to pull said colunn into supporting position between said body and frame.

19. The method of claim 18 which further includes returning the brace from its support position to its retained position by raising the body a sufficient amount so that the body's weight is no longer supported by said brace, grasping the handle means from a position wherein no portion of the operator's body is located within the pinch point between the chassis frame and body, pulling the handle outboard a sufficient distance until the retaining means are located outboard of the body, rotating the shaft means until the retaining means are adjacent their retained position, releasing the actuating force and guiding the retaining means into their retained location in engagement with said engaging means.

20. The method of claim 19 wherein said body is formed of a long beam and a plurality of cross beams thereby to define a cavity in which said retaining means are retained, said guiding step including guiding the retaining means into said cavity.

21. The method of claim 20 wherein said method is effected by a single individual.

22. The method of claim 18 wherein said handle is pulled and said retaining means are disengaged while said body is in its down position, thereafter raising said body to a height sufficient to cause said column by the action of gravity alone to achieve a position substantially perpendicular to said chassis frame and said coil spring means to pull said column into supporting alignment with said frame, and thereafter lowering said body until said column is in its supporting position between said body and frame.

23. The method of claim 22 wherein the controls for raising and lowering the body are located in the cab of the truck and the operator does not leave the truck cab from the time the body is initially raised until the column is in its supporting position.

24. The method of claim 18 wherein said retaining means comprises a plate member extending in the inboard direction from the bottom of said column, and wherein said column is placed in supporting position by the inboard extending portion of said plate member contacting the upper surface of said chassis frame, said column remaining outboard of said body and chassis.

* * * * *

UNITED STATES PATENT AND TRADEMARK OFFICE
CERTIFICATE OF CORRECTION

PATENT NO. : 4,138,158
DATED : February 6, 1979
INVENTOR(S) : Eldon D. Jones

It is certified that error appears in the above—identified patent and that said Letters Patent are hereby corrected as shown below:

Column 5, line 59, after "cludes" insert --means for attaching the brace to the dump body,--.

Signed and Sealed this

Eighteenth Day of November 1980

[SEAL]

Attest:

SIDNEY A. DIAMOND

*Attesting Officer*   *Commissioner of Patents and Trademarks*